(12) United States Patent
Yanagi et al.

(10) Patent No.: US 6,678,011 B2
(45) Date of Patent: Jan. 13, 2004

(54) FRONTED CIRCUIT

(75) Inventors: Shigeto Yanagi, Chiba (JP); Toshiyuki Nagano, Kanagawa (JP); Hiromichi Sano, Chiba (JP); Takayuki Kaida, Tokyo (JP)

(73) Assignee: Sony Corporation, Tokyo (JP)

( * ) Notice: Subject to any disclaimer, the term of this patent is extended or adjusted under 35 U.S.C. 154(b) by 414 days.

(21) Appl. No.: 09/842,557

(22) Filed: Apr. 26, 2001

(65) Prior Publication Data

US 2002/0005912 A1 Jan. 17, 2002

(30) Foreign Application Priority Data

Apr. 28, 2000 (JP) ...................... P2000-128833

(51) Int. Cl.⁷ ................................ H04N 5/44
(52) U.S. Cl. ................. 348/725; 348/678; 348/738
(58) Field of Search ................. 348/725, 726, 348/678, 738, 707; 375/345

(56) References Cited

U.S. PATENT DOCUMENTS 4,625,240 A * 11/1986 Yablonski et al. .......... 358/143
5,553,142 A *  9/1996 Tait ............................ 380/19

FOREIGN PATENT DOCUMENTS

| EP | 0574901 | 12/1993 |
|----|---------|---------|
| EP | 0696854 | 2/1996 |
| JP | 60217767 | 10/1985 |
| JP | 05336521 | 12/1993 |
| JP | 07321580 | 12/1995 |
| JP | 09181991 | 7/1997 |
| WO | 9946931 | 9/1999 |

OTHER PUBLICATIONS

Kunzman A J et al: "1394 High Performance Serial Bus: The Digital Interface For ATV" IEEE Transactions On Consumer Electronics, IEEE Inc. New York, US, vol. 41. No. 3 Aug. 1, 1995.

* cited by examiner

Primary Examiner—Victor R. Kostak
(74) Attorney, Agent, or Firm—Jay H. Maioli

(57) ABSTRACT

A band-pass filter separates an audio intermediate frequency signal from an input intermediate frequency signal, and an A/D converter circuit converts the audio intermediate frequency signal into a digital signal. A DSP performs audio detection on the digital signal and forms an AGC signal based on the signal. A variable gain amplifier performs AGC on the audio intermediate frequency signal in response to the AGC signal. A bandpass filter separates and takes out a video intermediate frequency signal from the signal, and an A/D converter circuit converts the video intermediate frequency signal into a digital signal. A DSP performs video detection on the signal. An AGC signal is formed based on the signals and AGC is performed on the video intermediate frequency signals by using the AGC signal.

8 Claims, 3 Drawing Sheets

FRONTED CIRCUIT

BACKGROUND OF THE INVENTION

1. Field of the Invention

The present invention relates to a frontend circuit.

2. Description of the Related Art

It has already been decided that a transition will be made from the current analog TV broadcast to ground-wave digital TV broadcast. In view of this, not only ICs for reception of digital TV broadcasts but also DSPs (digital signal processors) capable of processing a received digital signal have been developed.

However, in the transition performance from the analog TV broadcast to the digital TV broadcast, analog TV broadcasts and digital TV broadcasts will exist in a mixed manner.

In such a situation, to receive those two kinds of TV broadcasts, both of a frontend circuit (tuner circuit) for receiving an analog TV broadcast and outputting a video signal and an audio signal and a frontend circuit for receiving a digital TV broadcast and outputting a video signal and an audio signal will be necessary.

SUMMARY OF THE INVENTION

An object of the present invention is therefore to make it possible to receive both of analog TV broadcasts and digital TV broadcasts by means of a common, single frontend circuit.

An exemplary frontend circuit according to the invention comprises a first band-pass filter for separating and taking out an audio intermediate frequency signal from an input intermediate frequency signal; a first A/D converter circuit for A/D converting the audio intermediate frequency signal taken out by the first band-pass filter into a digital audio intermediate frequency signal; a first DSP for performing audio detection on the digital audio intermediate frequency signal that is output from the first A/D converter circuit, and for forming a first AGC (automatic gain control) signal based on the digital audio intermediate frequency signal; a variable gain amplifier provided on a signal line between the first band-pass filter and the first A/D converter circuit, for performing AGC on the audio intermediate frequency signal using the first AGC signal; a second band-pass filter for separating and taking out a video intermediate frequency signal from the input intermediate frequency signal; a second A/D converter circuit for A/D converting the video intermediate frequency signal taken out by the second band-pass filter into a digital video intermediate frequency signal; and a second DSP for performing video detection on the digital video intermediate frequency signal that is output from the second A/D converter circuit, and for forming a second AGC signal based on the digital video intermediate frequency signal, wherein control is so made that AGC is performed on the input intermediate frequency signal by using the second AGC signal.

With the above configuration, whether an analog TV broadcast or a digital TV broadcast is received, both of an audio signal and a video signal are demodulated by digital processing.

DETAILED DESCRIPTION OF THE PREFERRED EMBODIMENTS

Figure 1:
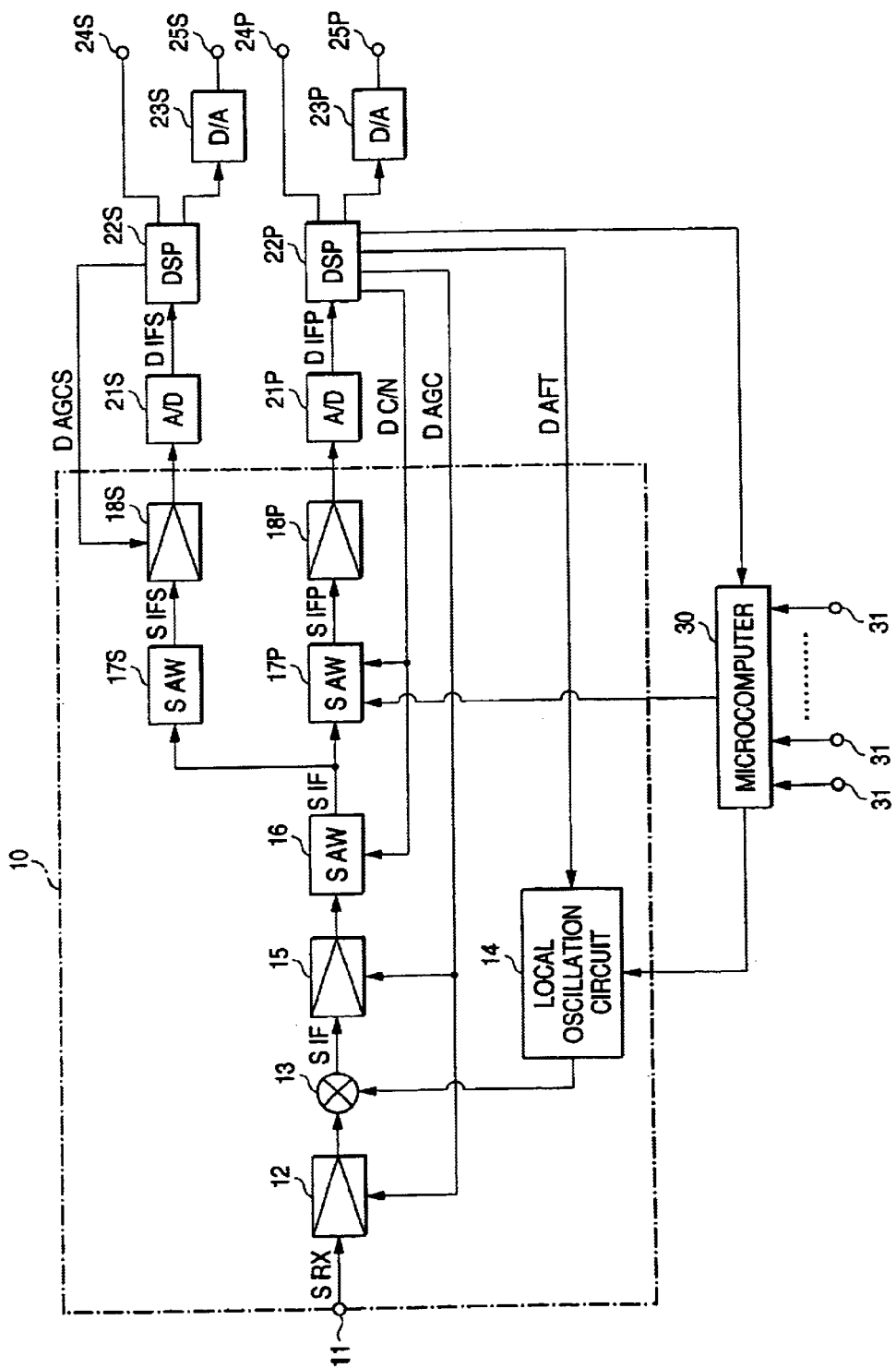
FIG. 1 is a block diagram showing a receiver according to an embodiment of the present invention.

In FIG. 1, reference numeral 10 denotes a frontend circuit. As described later in detail, the frontend circuit 10 is of a synthesizer type and a superheterodyne type and can receive both of analog TV broadcasts and digital TV broadcasts.

Reference symbols 22S and 22P denote DSPs that perform digital demodulation on a video intermediate frequency signal and an audio intermediate frequency signal that are in a digital signal state as well as various kinds of accompanying processing on a demodulated video signal and audio signal.

Reference numeral 30 denotes a microcomputer for system control. A plurality of manipulation keys (manipulation switches) 31 for tuning etc. are connected to the microcomputer 30.

During reception of an analog TV broadcast or a digital TV broadcast, its broadcast wave signal SRX is supplied from an input terminal 11 of the frontend circuit 10 to a mixer circuit 13 via a high-frequency amplifier 12. A local oscillation signal having a prescribed frequency is also supplied to the mixer circuit 13 from a local oscillation circuit 14. The broadcast wave signal SRX of a target channel is frequency-converted into an input intermediate frequency signal SIF. A video intermediate frequency signal and an audio intermediate frequency signal included in the input intermediate frequency signal SIF are denoted by the signal SIFP and the signal SIFS, respectively.

The input intermediate frequency signal SIF (SIFP+SIFS) is supplied to a band-pass filter 16 via an intermediate frequency amplifier 15. The pass bandwidth of the filter 16, which is a SAW filter, for example, is set at a one-channel width, that is, 6 MHz, of the analog TV broadcast and digital TV broadcast. In this manner, the input intermediate frequency signal SIF of the target channel is output from the filter 16.

The input intermediate frequency signal SIF thus taken out is supplied to a band-pass filter 17S that is a SAW filter, for example, where the audio intermediate frequency signal SIFS is separated and taken out. The signal SIFS is supplied via an audio intermediate frequency amplifier 18S to an A/D converter circuit 21S, where it is A/D-converted into a digital audio intermediate frequency signal DIFS, which is supplied to the DSP 22S.

The DSP 22S is to perform digital signal processing such as audio signal demodulation (decoding) and surround processing on the signal DIFS received. Therefore, a digital audio signal of the target TV broadcast is obtained from the DSP 22S.

The digital audio signal is converted by the DSP 22S into a serial signal, for example, which is output to an output terminal 24S. The digital audio signal is also supplied from the DSP 22S to a D/A converter circuit 23S, where it is D/A-converted into an analog signal, which is output to an output terminal 25S.

The audio intermediate frequency amplifier 18S is a variable gain amplifier. In the above processing, the DSP 22S detects the level of the analog audio intermediate frequency signal SIFS from the signal DIFS received. Data DAGCS indicating a detection result is supplied to the amplifier 18S as a gain control signal therefor. In this manner, the signal SIFS that is supplied from the amplifier 18S to the A/D converter circuit 21S is AGC-controlled so that its amplitude becomes, for example, equal to the input dynamic range of the A/D converter circuit 21S.

The input intermediate frequency signal SIF that is output from the filter 16 is also supplied to a band-pass filter 17P that is a SAW filter, for example, where the video intermediate frequency signal SIFP is separated and taken out. The signal SIFP is supplied via a video intermediate frequency amplifier 18P to an A/V converter circuit 21P, where it is A/D-converted into a digital video intermediate frequency signal DIFP, which is supplied to the DSP 22P.

The DSP 22P is to perform digital signal processing such as video detection (decoding) and component on the signal DIFP received. Therefore, a component signal, for example, of the target TV broadcast is obtained in a digital signal state from the DSP 22P.

The digital video signal is output to an output terminal 24P. The digital video signal is also supplied from the DSP 22P to a D/A converter circuit 23P, where it is D/A-converted into an analog signal, which is output to an output terminal 25P.

In the above processing, the DSP 22P detects a deviation in the video intermediate frequency of the analog video intermediate frequency signal SIFP from the signal DIFP received. Data DAFT indicating a detection result is supplied to the local oscillation circuit 14 as an oscillation frequency control signal therefor and AFT is performed there.

The high-frequency amplifier 12 and the intermediate frequency amplifier 15 are variable gain amplifiers. The DSP 22P detects the level of the analog intermediate frequency signal SIF based on the digital video intermediate frequency signal DIFP and the digital audio intermediate frequency signal DIFS in the DSP 22S. Data DAGC indicating a detection result is supplied to the high-frequency amplifier 12 and the intermediate frequency amplifier 15 as gain control signals therefor. In this manner, AGC is performed on the input intermediate frequency signal SIF.

The DSP 22P takes out various kinds of data that are included in the vertical blanking period and supplies those data to the microcomputer 30. The microcomputer 30 controls the local oscillation frequency of the local oscillation circuit 14 and thereby changes the reception channel.

The band-pass filters 16 and 17P are variable band-pass filters and their passage characteristics, in particular the cutoff characteristics on the carrier color signal side, can be changed. The DSP 22P detects the level of the analog video intermediate frequency signal SIFP from the signal DIFP and thereby detects the C/N ratio of the signal SIFP. Data DC/N indicating a detection result is supplied to the band-pass filters 16 and 17P as passage characteristic control signals therefor.

With this measure, when the C/N ratio of the analog video intermediate frequency signal SIFP is low, the pass bandwidths of the band-pass filters 16 and 17P are narrowed and an analog video intermediate frequency signal SIFP with an increased C/N ratio is output from the band-pass filter 17P.

The microcomputer 30 supplies the band-pass filter 17P with a control signal to be used for switching its pass bandwidth between a width for reception of a digital TV broadcast and a width for reception of an analog TV broadcast, whereby the pass bandwidth of the band-pass filter 17P is optimized during reception of each of a digital TV broadcast and an analog TV broadcast.

The receiver having the above configuration can receive both of analog TV broadcasts and digital TV broadcasts by means of the common frontend circuit 10. Since both of analog TV broadcasts and digital TV broadcasts can be received by means of the common frontend circuit 10, the space occupied by circuit parts can be made smaller and the cost can be reduced. The power consumption can also be reduced.

Since it is not necessary to distribute a received broadcast wave signal SRX to a frontend circuit for analog TV broadcasts and that for digital TV broadcasts, the minimum input sensitivity does not lower.

Since a broadcast wave signal SRX of an analog TV broadcast is demodulated digitally, DSP 22P can perform such various kinds of processing as ghost cancellation. Further, since a video signal and an audio signal are demodulated in a digital signal state, interfacing with subsequent signal processing is easy and convenient and processing in a single IC is enabled. In addition, adjustments that would otherwise be necessary during manufacture are made unnecessary.

Since a broadcast signal SRX of an analog TV broadcast is demodulated digitally, when its reception electric field strength is at a medium level, the S/N ratio can be made larger by about 3 dB than in the case of analog demodulation by setting the number of effective bits in the A/D conversion at 9 or more bits.

Since the passage characteristics of the band-pass filters 16 and 17P are changed in accordance with the C/N ratio of an analog video intermediate frequency signal SIFP, a proper video signal can be obtained even if the reception electric field strength of a broadcast wave signal SRX is low.

Even if the level of a broadcast wave signal SRX varies depending on the reception conditions or the reception state during reception of an analog TV broadcast or a digital TV broadcast, an analog video intermediate frequency signal SIFP and an analog audio intermediate frequency signal SIFS can be A/D-converted effectively.

More specifically, since AGC is performed in the high-frequency amplifier 12 and the intermediate frequency amplifier 15, the level of an analog input intermediate frequency signal SIF is kept almost constant irrespective of the reception state of a broadcast wave signal SRX. Therefore, the amplitude of an analog video intermediate frequency signal SIFP that is supplied to the A/D converter circuit 21P can be made, for example, equal to the input dynamic range of the A/D converter circuit 21P.

An analog audio intermediate frequency signal SIFS is subjected to AGC also in the amplifier 18S. Therefore, when the analog audio intermediate frequency signal SIFS is A/D-converted by the A/D converter circuit 21S, its amplitude can also be made, for example, equal to the input dynamic range of the A/D converter circuit 21S. Therefore, the analog video intermediate frequency signal SIFP and the analog audio intermediate frequency signal SIFS can be A/D-converted effectively without causing useless bits.

Figure 2:
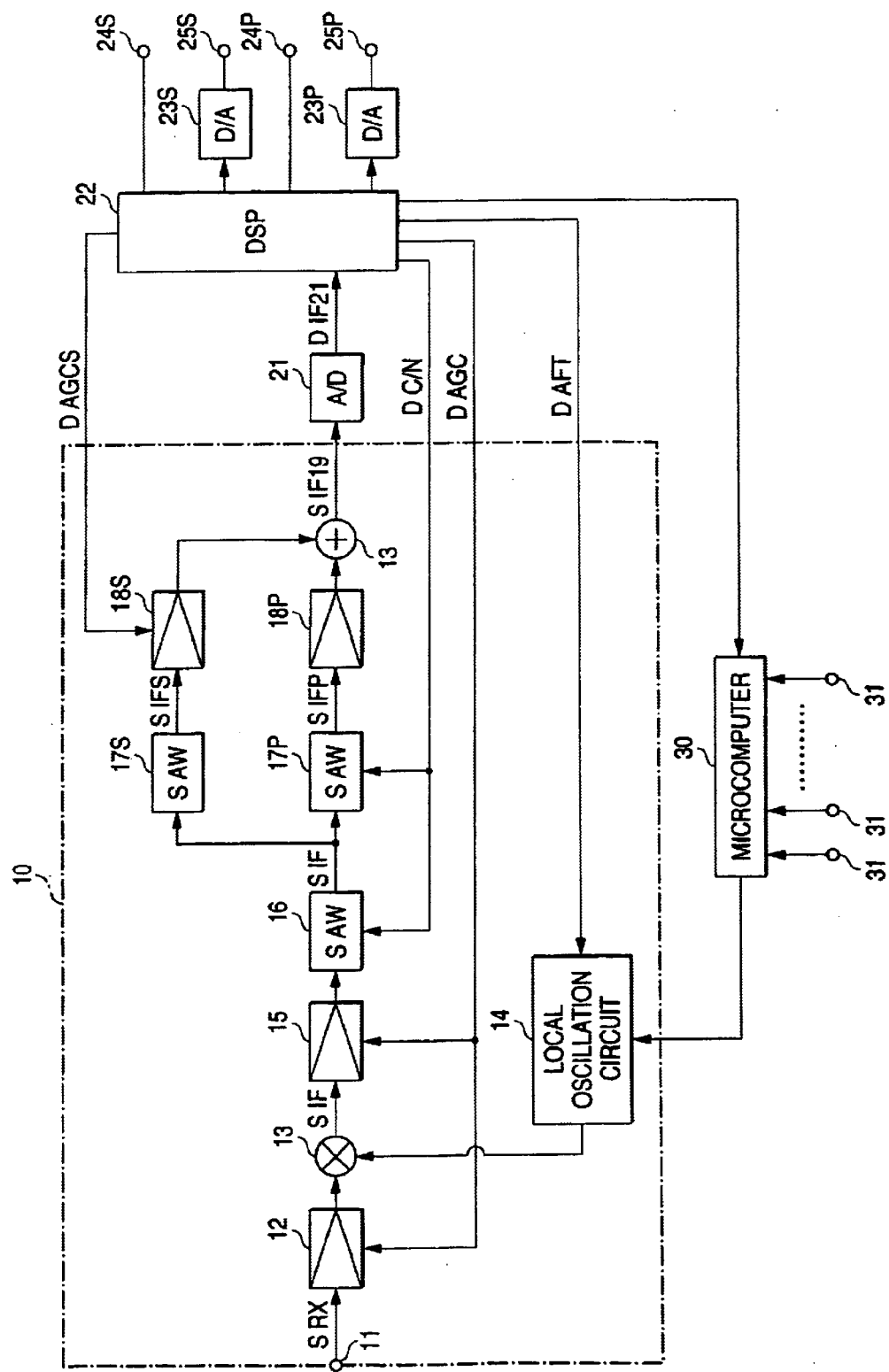
FIG. 2 is a block diagram showing a receiver according to another embodiment of the invention.

The above embodiment is directed to the case where an audio intermediate frequency signal SIFS and a video intermediate frequency signal SIFP that have been separated from an input intermediate frequency signal SIF are A/D-converted independently of each other. In a frontend circuit 10 shown in FIG. 2, an audio intermediate frequency signal SIFS and a video intermediate frequency signal SIFP are A/D-converted together.

Specifically, an analog audio intermediate frequency signal SIFS that is supplied from the audio intermediate frequency amplifier 18S and an analog video intermediate frequency signal SIFP that is supplied from the video intermediate frequency amplifier 18P are supplied to an addition circuit 19. An addition signal SIF 19 of the signals SIFS and SIFP is output from the addition circuit 19.

The signal SIF 19 is supplied to an A/D converter circuit 21, where it is converted into a digital addition signal DIF 21, which is supplied to a DSP 22. The DSP 22 is to perform the processing of the DSPs 22S and 22P shown in FIG. 1. Therefore, as described above, audio signals are output to the terminals 24S and 25S in a digital signal state and an analog signal state, respectively, and video signals are output to the terminals 24P and 25P in a digital signal state and an analog signal state, respectively.

The DSP 22 outputs individual control signals, whereby the AGC of the audio intermediate frequency amplifier 18S, the AGC of each of the amplifiers 12 and 15, and the AFT of the local oscillation circuit 14 are performed and the passage characteristics of the band-pass filters 16 and 17P are controlled. Further, the DSP 22 supplies data included in the vertical blanking period to the microcomputer 30.

Therefore, this receiver can receive both of analog TV broadcasts and digital TV broadcasts like the receiver of FIG. 1 and the cost of this receiver can be made lower than the receiver of FIG. 1.

Figure 3:
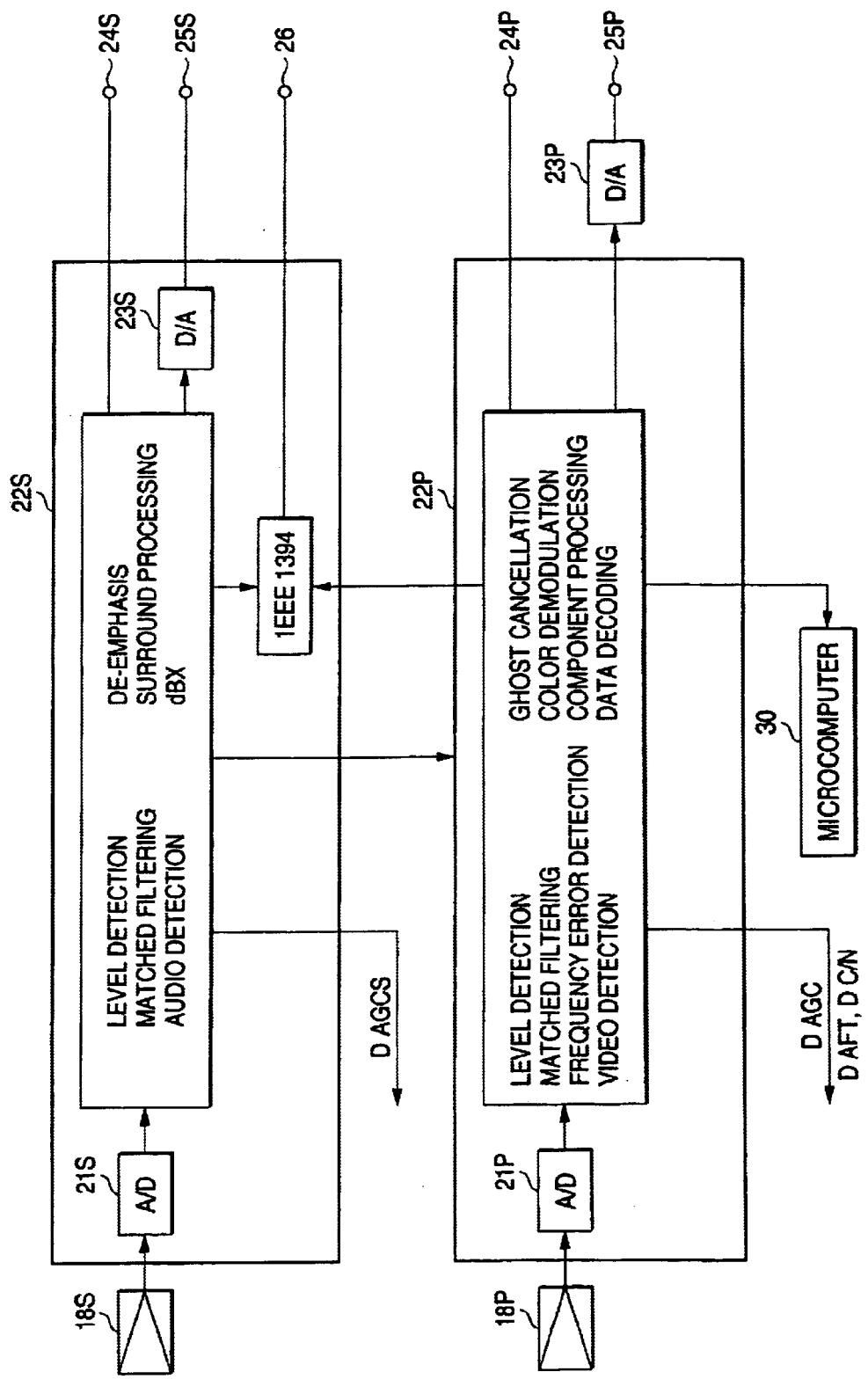
FIG. 3 is a block diagram showing an example of the contents of processing of DSPs according to the invention.

FIG. 3 shows an example of the contents of processing of the DSPs 22S and 22P. This example is directed to a case where the A/D converter circuit 21S and the D/A converter circuit 23S are incorporated in the DSP 22S and the A/D converter circuit 21P is incorporated in the DSP 22P.

Specifically, in the DSP 22S, matched filtering and audio detection are performed on a digital audio intermediate frequency signal DIFS that is supplied from the A/D converter circuit 21S and such pieces of processing as de-emphasis, surround processing, and dBx are performed on a resulting audio detection output. A digital audio signal as a processing result is output to the terminal 24S, and it is also converted by the D/A converter circuit 23S into an analog audio signal, which is output to the terminal 25S. In this case, the I2S format, for example, can be used as a format of a digital audio signal that is output to the terminal 24S. An I2C bus or the like can be used in designating desired processing externally.

In the DSP 22S, the level of an analog audio intermediate frequency signal SIFS is detected from a digital audio intermediate frequency signal DIFS and data DAGCS for AGC is formed. Further, a digital audio signal obtained in the DSP 22S or a digital video signal obtained in the DSP 22P is converted into a signal having a format that complies with the IEEE 1394 and is output from a terminal 26.

On the other hand, in the DSP 22P, matched filtering and video detection are performed on a digital video intermediate frequency signal DIFP that is supplied from the A/D converter circuit 21P and such pieces of processing as ghost cancellation, color demodulation, and component processing are performed on a resulting video detection output.

A digital video signal as a result of the above processing is output to the terminal 24P, and it is also converted by the D/A converter circuit 23P into an analog video signal, which is output to the terminal 25P. In this case, the format of a video signal that is output to the terminal 24P or 25P can be selected from:

(1) composite signal
   format for digital VTR
   format for studio interface
(2) component signal
   format for digital VTS
   format for studio interface
(3) Y/C-separated signal.

At this time, in the DSP 22P, the level of an analog video intermediate frequency signal SIFP is detected and data DAGC for AGC is formed based on a detection result and data DAGCS that is supplied from the DSP 22S. Data DAFT for AFT and data DC/N for C/N ratio increase are also formed in the DSP 22P. Further, various kinds of data included in the vertical blanking period are taken out by the DSP 22P and supplied to the microcomputer 30.

As described above, each of the DSPs 22S and 22P can perform demodulation of an audio signal or a video signal and various kinds of processing to be performed after the demodulation.

AGC can be performed on a video intermediate frequency signal SIFP in the same manner as is performed on an audio intermediate frequency signal SIFS in each of the above embodiments. To this end, the video intermediate frequency amplifier 18P is made a variable gain amplifier. The level of the analog video intermediate frequency signal SIFP is detected by the DSP 22P, and the gain of the video intermediate frequency amplifier (variable gain amplifier) 18P is controlled in accordance with a detection result.

What is claimed is:

1. A frontend circuit comprising:

a first bandpass filter for separating and taking out an audio intermediate frequency signal from an input composite intermediate frequency signal;

a first A/D converter circuit for A/D converting the audio intermediate frequency signal taken out by the first bandpass filter into a digital audio intermediate frequency signal;

a first DSP for performing audio detection on the digital audio intermediate frequency signal that is output from the first A/D converter circuit and for forming a first AGC signal based on the digital audio intermediate frequency signal;

a variable gain amplifier provided on a signal line between the first bandpass filter and the first A/D converter circuit for performing AGC on the audio intermediate frequency signal using the first AGC signal;

a second bandpass filter for separating and taking out a video intermediate frequency signal from the input composite intermediate frequency signal;

a second A/D converter circuit for A/D converting the video intermediate frequency signal taken out by the second bandpass filter into a digital video intermediate frequency signal; and a second DSP for performing video detection on the digital video intermediate frequency signal that is output from the second A/D converter circuit and for forming a second AGC signal based on the digital video intermediate frequency signal, wherein AGC is performed on the input composite intermediate frequency signal using the second AGC signal.

2. The frontend circuit according to claim 1, wherein the first AGC signal and the second AGC signal are formed independently by the first DSP and the second DSP, respectively.

3. The frontend circuit according to claim 1, wherein the first A/D converter circuit and the second A/D converter circuit are combined in a single A/D converter circuit common to the audio intermediate frequency signal and the video intermediate frequency signal.

4. The frontend circuit according to claim 1, wherein the first DSP and the second DSP are combined in a single DSP common to the digital audio intermediate frequency signal and the digital video intermediate frequency signal.

5. The frontend circuit according to claim 1, wherein the first A/D converter circuit and the second A/D converter circuit are combined in a single A/D converter circuit common to the audio intermediate frequency signal and the video intermediate frequency signal, and wherein the first DSP and the second DSP are combined in a single DSP common to the digital audio intermediate frequency signal and the digital video intermediate frequency signal.

6. The frontend circuit according to claim 1, wherein the second DSP detects a frequency deviation in the video intermediate frequency signal from the digital video intermediate frequency signal, and wherein AFT is performed by controlling a local oscillation frequency by using the detected frequency deviation.

7. The frontend circuit according to claim 1, wherein the second DSP detects reception electric field strength of a broadcast wave signal from the digital video intermediate frequency signal, and wherein a signal pass characteristic of the second bandpass filter is controlled using the detected reception electric field strength.

8. The frontend circuit according to claim 1, wherein a digital audio signal that is output from the first DSP or a digital video signal that is output from the second DSP is an IEEE 1394 format signal.

\* \* \* \* \*